Sept. 18, 1956  E. F. KLESSIG  2,763,216
POWER TRANSMISSION
Filed Feb. 7, 1951

*INVENTOR.*
ERNST F. KLESSIG
BY
*Ralph L. Tweedale*

United States Patent Office 2,763,216
Patented Sept. 18, 1956

2,763,216

POWER TRANSMISSION

Ernst F. Klessig, Berkley, Mich., assignor to Vickers Incorporated, Detroit, Mich., a corporation of Michigan Application February 7, 1951, Serial No. 209,801

10 Claims. (Cl. 103—136)

This invention relates to power transmissions, and is particularly applicable to those of the type comprising two or more fluid pressure energy translating devices, one of which may function as a pump and another as a fluid motor.

This invention is concerned generally with rotary fluid pumps and in particular with those of the rotary vane type. The present invention deals with pumps of the type mentioned wherein there are formed a plurality of fluid intake zones and a plurality of fluid outlet zones necessitating a construction enabling fluid to be conducted from a single inlet connection port to all of the fluid inlet zones and enabling fluid to be conducted from the plurality of fluid outlet zones to a single outlet connection.

In many applications it is not only desirable but necessary that the inlet and outlet connection ports be on one side of the pump. This presents the problem of providing inlet and outlet passages in the housing for the multiple sets of fluid inlet and outlet zones without intricate coring and a multiplicity of passages which would make the cost of the device excessive. It presents a more difficult problem where the pump is to be provided with a pressure delivery chamber within which is floatably mounted a pressure responsive cheek plate adapted to be maintained in fluid sealing engagement against the pump mechanism. In this type of construction the cheek plate is maintained in fluid sealing engagement against the pumping mechanism by fluid pressure in the chamber and the proper running clearance between the surfaces against which the rotor turns is thus automatically maintained. In addition, where it is desired to retain the features of radial balance and of pressure loaded cheek plate construction for maintaining proper rotor running clearance, and the device is to be utilized in installations requiring the inlet and outlet connections and fluid passages associated therewith on one side of the body and the drive shaft extending from the opposite side the problem becomes much more difficult.

It is an object of the present invention to provide a novel, simple, and economical way of connecting up the multiplicity of fluid inlet and outlet zones of the pumping mechanism respectively to an inlet connection port and an outlet connection port which are located on one side of the pumping mechanism.

It is another object of this invention to provide in rotary pumps of the type mentioned, wherein the inlet and outlet connections are on one side of the pumping mechanism and which utilize a pressure responsive cheek plate in a delivery chamber for maintaining proper rotor clearance, an improved fluid inlet and outlet passage construction located completely on one side of the body.

It is a further object of this invention to provide in a rotary type of pump having a plurality of fluid inlet zones and a plurality of fluid outlet zones and wherein the inlet and outlet passages are on one side of the pumping mechanism, an improved and simplified type of construction wherein the total displacement of the pumping mechanism is delivered to the outlet passage through only one of the fluid zones.

Specifically, it is an object of this invention to provide the features recited for rotary pumps having the inlet and outlet connection on one side of the body and the drive shaft extending from the opposite side of the body.

It is still another object of this invention to provide a simplified low cost structure of the aforementioned type having advantages contributing to efficiency, reliability, and long life as well as ease of maintenance.

Further objects and advantages of the present invention will be apparent from the following description, reference being had to the accompanying drawings wherein a preferred form of the present invention is clearly shown.

Figure 2:
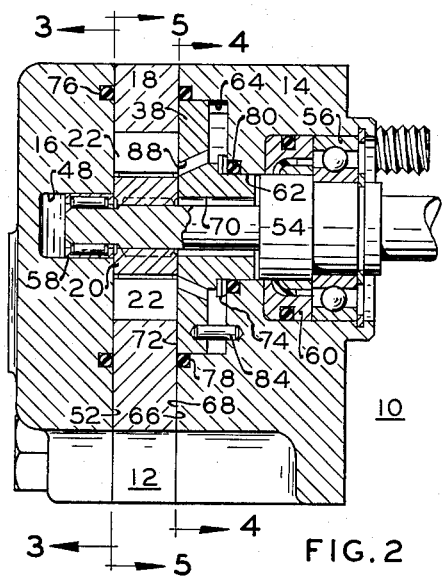
Figure 2 is a view taken on line 2—2 of Figure 1.

Referring to Figure 2, there is shown a rotary vane pump 10 comprising a central pumping unit, indicated generally by the numeral 12, mounted between a right end housing member 14 and a left end housing member 16. The pumping unit 12 and housing members 14 and 16 are maintained in abutting relationship by suitable screws 17, 19, 21, and 23. The screws 17 and 19 extend from the housing 14 for clamping the device to a mounting surface. Tapped holes 25 and 27 are provided in bosses where the connection ports are located, which register with holes provided in the cam ring 18 and housing 14 for the purpose of fastening external connection fittings to the housing 16 and which also maintain the central and end members of the device in abutting relationship.

Figure 5:
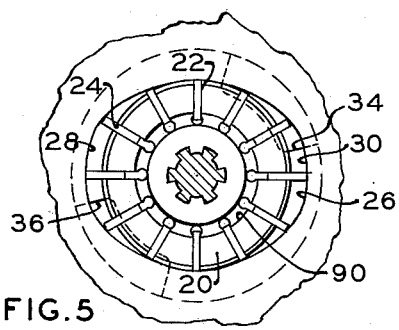
Figure 5 is a fragmentary view taken on line 5—5 of Figure 2.
Figure 4:
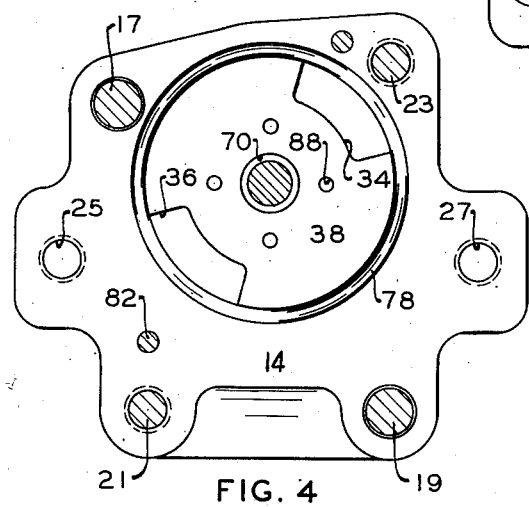
Figure 4 is a view taken on line 4—4 of Figure 2.

The pumping unit 12 comprises a cam ring 18 the space within which is utilized as a pumping chamber for mounting a hubless rotor 20, shown in Fig. 5, carrying vanes 22 which reciprocate in slots 24. The outer ends of the vanes are maintained against the substantially oval shaped inner surface 26 of the cam ring 18 which forms a track for the vanes, by pressure fluid conducted to the inner ends of the slots in a manner hereinafter explained. With the rotor 20 mounted within the cam ring 18 two opposing working chambers 28 and 30 are formed. These chambers may be appropriately divided into a set of fluid intake zones and a set of fluid delivery zones through which the vanes move as the rotor turns. The set of inlet fluid zones comprise the portions of the chambers 28 and 30 registering with a set of diametrically opposed fluid inlet openings 32 and 33 on one surface of the end member 16 facing the pumping unit 12. The outlet fluid zones comprise those portions of the chambers 28 and 30 registering with a set of diametrically opposed outlet or delivery ports 34 and 36 extending completely through a cheek plate 38, shown in Fig. 4, and located in the housing member 14 immediately adjacent the pumping unit 12. A fluid outlet or delivery opening 40 is also formed in end member 16, on the same surface as the inlet openings 32 and 33, which registers with only one of the fluid outlet zones. The outlet opening 40 registers with the same fluid delivery or outlet zone as does the delivery port 36 in the cheek plate 38, but on the opposite side of said fluid zone. As will later be explained, this arrangement permits the entire displacement of the pumping unit 12 to be conducted through only one of the fluid outlet zones to the outlet passage and outlet connection port in the end housing member 16.

Figure 1:
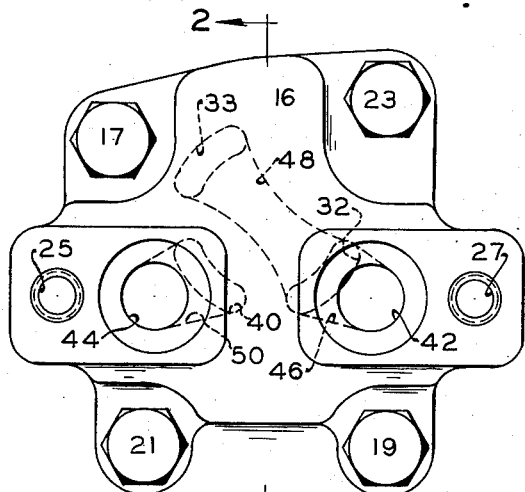
Figure 1 is an end view of a preferred form of the present invention.
Figure 3:
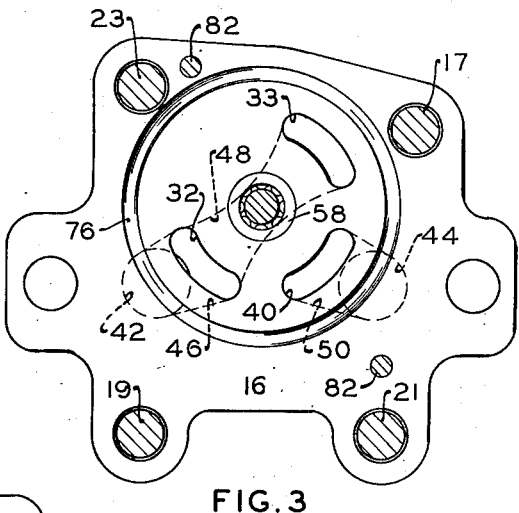
Figure 3 is a view taken on line 3—3 of Figure 2.

As shown in Figures 1 and 3, the end member 16 is provided with an external inlet connection port 42 and an external outlet or delivery connection port 44. The inlet port 42 leads by a cored passage 46 provided with the fluid opening 32 to one of the fluid inlet zones and by a branch passage 48 provided with the fluid opening 33 to the other fluid inlet zone which is diametrically opposed in location.

The outlet connection port 44 is connected by a cored passage 50, provided with the fluid outlet opening 40, directly to the fluid outlet zone with which the fluid opening 40 registers and with which the outlet port 36 of the cheek plate 38 registers on the opposite side of the pumping unit.

The end member 16 is provided with a flat surface indicated by the numeral 52 on the side immediately adjacent the pumping unit 18 which serves to enclose the pumping chamber on one side and to provide a fixed surface against which the rotor is maintained in fluid sealing engagement. A drive shaft 54, spline connected to the rotor 20, is rotatably supported on a radial bearing 56 in the housing 14 and a needle bearing 58 in the housing member 16. A suitable seal 60 surrounds the shaft 54 immediately adjacent the bearing 56.

The housing member 14 is provided with a stepped bore 62 extending completely therethrough for mounting the shaft, seal and bearing and which is enlarged at one end thereof to form a delivery chamber 64. Both the cam ring 18 and the housing member 14 are provided with flat mating surfaces indicated by the numerals 66 and 68, so that the open end of the delivery chamber is immediately adjacent the cam ring 18 and rotor 20.

The cheek plate 38 is provided with a bore 70 through which the shaft extends and is supported by the walls of the chamber 64, rather than by the shaft 54. The cheek plate is also provided with a flat surface indicated by the numeral 72 which is maintained in engagement against a portion of the surface 66 of the cam ring 18, which acts as a fixed abutment for the outer periphery of the cheek plate, and is maintained in fluid sealing engagement against the rotor by pressure fluid delivered to the delivery chamber through the cheek plate porting and acting on the opposite exposed side of the cheek plate. The cheek plate 38 encloses the pumping chamber on one side thereof and by means of pressure fluid delivered to the delivery chamber through the cheek plate porting is maintained in fluid sealing engagement against the rotor so as to maintain the proper rotor running clearance. At starting and at extremely low pressures the cheek plate is maintained in fluid sealing engagement against the rotor and against the cam ring 18 by means of a spring 74.

Other suitable seals are provided in the device 10 on opposite sides of the cam ring 18 in the housing members 14 and 16 indicated by the numerals 76 and 78 and at one end of the delivery chamber 64 surrounding the shaft 54 indicated by the numeral 80. Proper alignment of the cam ring with the housing members 14 and 16 is provided by a pair of dowel pins indicated by the numeral 82 extending from the cam ring into the housing members on opposite sides. The cheek plate is aligned properly with the pumping unit 12 by means of a dowel pin 84 extending from the cheek plate 38 into the housing member 14. Pressure fluid is delivered to the inner ends of the vane slots, so as to maintain the outer ends of the vanes 22 in engagement with the vane track 26 by connecting the delivery chamber through ports 88 in the cheek plate to a pressure groove 90 of the rotor 20.

In operation with the rotor turning counterclockwise, as viewed in Fig. 5, fluid is conducted to the set of fluid inlet zones of the pumping chambers 28 and 30 by means of the inlet port 42, passages 46 and 48 and the fluid inlet openings 32 and 33. As the rotor 38 turns the fluid between the vanes passing through the fluid outlet zone registering with the fluid opening 40 in the housing member 16, is forced out of said outlet zone through the fluid outlet opening 40 and is conducted to the outlet port 44 by means of passage 50. Fluid between the vanes passing through the outlet fluid zone diametrically opposed to the fluid outlet zone registering with the fluid opening 40 is forced out of said zone through the cheek plate outlet port 34 into the delivery chamber 64. Due to the constant displacement of fluid into this chamber from the fluid outlet zone mentioned, fluid in the chamber is constantly being forced from the chamber and to the outlet port 44 by means of the cheek plate port 36, fluid outlet opening 40 and passage 50.

Thus the fluid outlet zone registering with the fluid outlet opening 40 in the housing member 16 serves as a delivery port for connecting the displacement of the pumping unit 18 delivered into the delivery chamber 64 to the outlet passage formed in the housing member 16 on the opposite side of the rotor to that of the delivery chamber 64. Pressure fluid delivered to the chamber maintains the cheek plate in fluid sealing engagement with the rotor. Pressure fluid from the chamber is also delivered through the cheek plate ports 88 to the underside of the vane slots to urge the vanes outwardly into contact with the vane track.

The arrangement is such that the total displacement of the pump passing through outlet passage 50 is delivered thereto through the fluid outlet zone registering with the fluid outlet opening 40 in the housing 16.

By this arrangement the inlet and outlet connection ports and their associated inlet and outlet passages which must be connected to the set of fluid inlet zones and the set of fluid outlet zones of the pumping mechanism may be located completely on one side of the housing. In addition the inlet and outlet ports and associated passages may be placed on the side of the housing opposite to that from which the drive shaft extends. This is accomplished without complicated coring and intricate passage construction.

The feature of radial balance achieved through providing opposing sets of fluid inlet and outlet zones is retained as is the feature of a pressure loaded cheek plate responsive to the pressure in the delivery chamber for maintaining proper rotor running clearance. These features are retained without added costs of intricate coring and a multiplicity of passages in spite of the fact that the inlet and outlet connections and passages associated therewith connected to the opposing sets of fluid inlet and outlet zones are on the side of the pumping mechanism opposite to that of the delivery chamber and on the side of the housing opposite from which the drive shaft extends.

While the form of embodiment of the invention as herein disclosed constitutes a preferred form, it is to be understood that other forms might be adopted, all coming within the scope of the claims which follow.

What is claimed is as follows:

1. In a rotary fluid energy translating device the combination of a stator having externally located inlet and outlet connections, a rotor mounted therein and forming a set of fluid inlet zones and a set of fluid delivery zones, a branched passage in the stator on one side of the rotor and leading directly from one of the said connections to one set of the fluid zones, means forming a recess in the stator on the opposite side of the rotor to that of the branched passage and immediately adjacent the rotor, a cheek plate in the recess one side of which is maintained in fluid sealing engagement against the rotor and forming a chamber on the opposite side of the cheek plate, a plurality of fluid ports in the cheek plate registering with the other set of fluid zones and extending therethrough to the chamber, a second passage leading from only one zone of the other set of fluid zones from the side of the rotor opposite the chamber to the other of said connections, and a drive shaft operatively connected to the rotor and extending from the stator on the chamber side of the stator.

2. In a rotary fluid energy translating device the combination of a stator having externally located inlet and outlet connections, a rotor mounted therein and forming a set of fluid inlet zones and a set of fluid delivery zones, a branched passage completely on one side of the rotor and leading directly from one of the said connections to one set of the fluid zones, means forming a recess immediately adjacent the rotor on the side opposite to the branched terminal passage, a pressure responsive cheek plate floatably mounted in the recess to form a pressure chamber adjacent one side thereof and the opposite side thereof being maintained in fluid sealing engagement against the rotor by pressure fluid in the chamber, a plurality of fluid ports in the cheek plate registering with the other set of fluid zones and extending through the cheek plate to the pressure chamber, a second passage completely on the same side of the rotor as the branched passage and leading from only one zone of the other set of fluid zones to the other of said connections, and a drive shaft operatively connected to the rotor extending from the pressure chamber side of the stator.

3. In a rotary fluid energy translating device the combination of a stator having externally located inlet and outlet connections, means forming a working chamber therein, a rotor mounted in the chamber and together forming a set of fluid inlet zones and a set of fluid delivery zones, a branched passage completely on one side of the rotor and leading from one of the said connections directly to one set of the fluid zones, means forming a recess in the stator on the opposite side of the rotor and immediately adjacent thereto, a cheek plate floatably mounted in the recess and forming a pressure chamber adjacent the cheek plate, said cheek plate having a plurality of fluid ports registering with the other set of fluid zones and extending therethrough to the pressure chamber, said cheek plate enclosing the working chamber and being maintained in fluid sealing engagement against the rotor by fluid pressure in the pressure chamber, a second passage completely on the same side of the rotor as the branched passage and leading directly from only one of the zones of the other set of fluid zones to the other stator connection, and a drive shaft extending through the cheek plate operatively connected to the rotor and extending from the pressure chamber side of the stator.

4. In a rotary, vane fluid energy translating device the combination of a housing having a working chamber, said housing also having externally located inlet and outlet connections, a slotted rotor carrying a plurality of substantially radially movable vanes and mounted in said chamber to form a set of fluid inlet zones and a set of fluid delivery zones through which the vanes pass as the rotor turns, a branched passage completely on one side of the rotor and leading from one of the said connections directly to one set of the fluid zones, means forming a recess on the opposite side of the rotor and immediately adjacent to the working chamber, a cheek plate floatably mounted in the recess to form a pressure chamber, said cheek plate being urged in fluid sealing engagement against the rotor by pressure in the pressure chamber and enclosing the working chamber, a set of fluid ports in the cheek plate registering with the other set of fluid zones and extending therethrough to the pressure chamber, a second passage on the same side of the rotor as the branched passage and leading directly from only one zone of the other set of fluid zones to the other of said connections, and a drive shaft operatively connected to the rotor and extending from the pressure chamber side of the housing.

5. A rotary, vane fluid energy translating device comprising a central working unit having parallel plane sides and including a stationary outer ring and an inner rotor carrying a plurality of movable vanes, said ring and rotor together forming a set of fluid inlet zones and a set of fluid delivery zones through which the vanes move as the rotor turns, a pair of housing members having plane mating sides on opposite sides of the pumping unit, one of said members having externally located inlet and outlet connections, said one of said members also having a branched terminal passage leading from one of the said connections directly to one set of the fluid zones and a second passage leading directly from only one of the zones of the other set of fluid zones to the other of said connections, the other housing member having a recess the open end of which is immediately adjacent the working unit, a cheek plate floatably mounted in the recess to form a pressure chamber at one side of the cheek plate and the opposite side of the cheek plate being maintained in fluid sealing engagement against the rotor and ring, a plurality of fluid ports in the cheek plate registering with said other set of fluid zones and extending therethrough to the pressure chamber, and a drive shaft operatively connected to the rotor extending through the cheek plate and from the housing.

6. A rotary, vane fluid energy translating device comprising a slotted rotor carrying a plurality of substantially radially movable vanes, a cam ring of noncircular inner contour surrounding the rotor to form diametrically opposite sets of fluid inlet zones and fluid delivery zones through which the vanes move as the rotor turns, a pair of housing members on opposite sides of the ring and rotor, one housing member having externally located inlet and outlet connections and a branched passage leading from one of the said connections directly to one set of the fluid zones and a second passage leading directly from only one of the zones of the other set of fluid zones to the other of said connections, the other housing member having a recess immediately adjacent to and the open end of which is closed by the ring and rotor, a cheek plate mounted in the recess in fluid sealing engagement against the rotor and forming a pressure chamber adjacent the cheek plate, a plurality of fluid ports in the cheek plate connecting the other set of fluid zones to the pressure chamber, and a drive shaft operatively connected to the rotor and extending from the housing provided with the pressure chamber.

7. A rotary fluid energy translating device comprising a stator having externally located inlet and outlet connections, a rotor mounted therein and forming a set of fluid inlet zones and a set of fluid delivery zones, a branched passage leading directly from one of the said connections to one set of the fluid zones and a second passage leading directly from only one zone of the other set of fluid zones to the other of said connections, said passages being in the stator completely on one side of the rotor, fluid passage means on the opposite side of the rotor connecting the remaining fluid zones of the other set of fluid zones to the fluid zone from which the second passage leads, and a drive shaft operatively connected to the rotor and extending from that side of the stator opposite to the branched and second passages.

8. A rotary, vane fluid energy translating device comprising a housing having a working chamber, said housing also having externally located inlet and outlet connections, a rotor carrying a plurality of movable vanes and mounted in the chamber to form a set of fluid inlet zones and a set of fluid delivery zones, a branched passage in the housing leading from one of the said connections directly to one set of the fluid zones and a second passage leading directly from only one zone of the other set of fluid zones to the other of said connections, said passages being in the housing completely on one side of the rotor, fluid passage means in the housing on the opposite side of the rotor connecting the remaining zones of the other set of fluid zones to the fluid zone from which the second passage leads, and a drive shaft operatively connected to the rotor and extending from that side of the housing opposite to the branched and second passages.

9. In a rotary fluid energy translating device the combination of a stator having an inlet and a delivery connection, a rotor mounted in the stator and forming a set of fluid inlet zones and a set of fluid delivery zones, means forming two passages in the stator, one of which is branched and connects one set of fluid zones in parallel to one of the connections, the second of which directly connects only one zone of the other set of fluid zones to the other connection, a third passage means connecting each of the remaining zones of the other set of fluid zones in series to the single fluid zone of said set which is connected to the second passage, and a drive shaft operatively connected to the rotor and extending from that side of the stator opposite to the side having the second passage.

10. In a rotary fluid energy translating device the combination of a stator having an inlet and a delivery connection, a rotor mounted in the stator and forming a set of fluid inlet zones and a set of fluid delivery zones, means forming two passages in the stator, one of which is branched and connects one set of fluid zones in parallel to one of the connections, the second of which directly connects only one zone of the other set of fluid zones to the other connection, said connections and passages being located in the stator completely on one side of the rotor, a third passage means completely on the opposite side of the rotor connecting each of the remaining zones of the other set of fluid zones in series to the single fluid zone of said set which is connected to the second passage, and a drive shaft operatively connected to the rotor and extending from that side of the stator opposite to the side having the connections and the branched and said second passages.

References Cited in the file of this patent

UNITED STATES PATENTS

| | | |
|---|---|---|
| 1,635,006 | Oliver | July 5, 1927 |
| 1,989,900 | Vickers | Feb. 5, 1935 |
| 2,098,652 | Buckbee | Nov. 9, 1937 |
| 2,255,785 | Kendrick | Sept. 16, 1941 |
| 2,387,761 | Kendrick | Oct. 30, 1945 |
| 2,411,602 | Tweedale | Nov. 26, 1946 |
| 2,487,721 | Minshall | Nov. 8, 1949 |
| 2,544,987 | Gardiner et al. | Mar. 13, 1951 |